No. 852,660. PATENTED MAY 7, 1907.
F. P. FISHER.
PORTABLE MIRROR HOLDER.
APPLICATION FILED JAN. 7, 1907.

Witnesses.
C. H. Gannett
J. Murphy

Inventor.
Frederick P. Fisher
by Jas. H. Churchill
atty.

UNITED STATES PATENT OFFICE.

FREDERICK P. FISHER, OF BOSTON, MASSACHUSETTS.

PORTABLE MIRROR-HOLDER.

No. 852,660.  Specification of Letters Patent.  Patented May 7, 1907.

Application filed January 7, 1907. Serial No. 351,071.

*To all whom it may concern:*

Be it known that I, FREDERICK P. FISHER, a citizen of the United States, residing in Boston, in the county of Suffolk and State of Massachusetts, have invented an Improvement in Portable Mirror-Holders, of which the following description, in connection with the accompanying drawings, is a specification, like letters on the drawings representing like parts.

This invention relates to a portable mirror holder, especially designed and adapted among other uses, to be employed by traveling men.

The invention has for its object to provide a portable mirror holder which is capable of being applied to the lower sash of a window, either in the closed or open position of the latter, so as to obtain the best possible light for shaving, and which can be folded up so as to occupy little space, thereby enabling the mirror and its holder to be packed in the grip or bag of the traveling man, and occupy substantially little space.

The particular features of this invention will be pointed out in the claims at the end of this specification.

Figure 1:
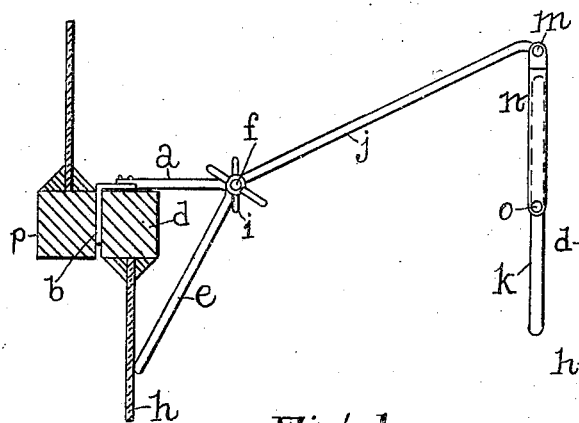
Figure 2:
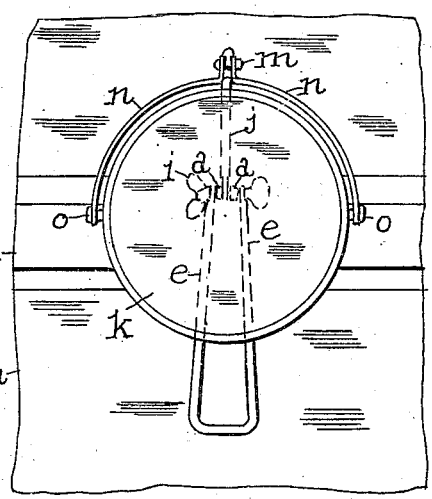
Figure 3:
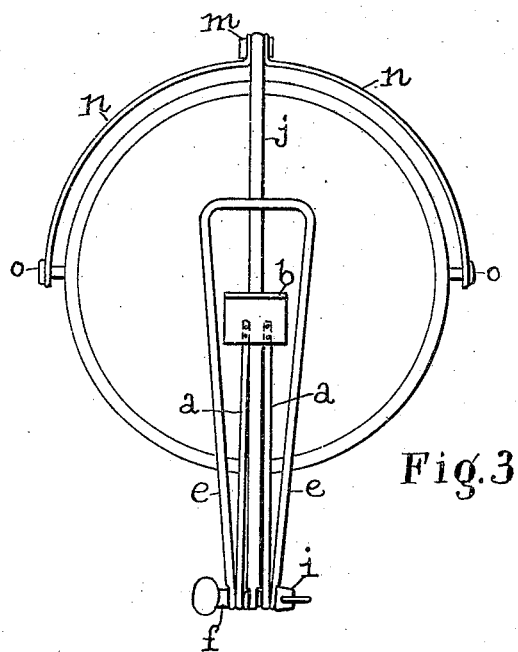

Figure 1 is a side elevation of a mirror and its holder embodying this invention, showing the same applied to a window, which is represented in section. Fig. 2, a front elevation of the mirror and its holder shown in Fig. 1. Fig. 3, a rear view of the mirror with its holder folded up, and Figs. 4 and 5, modifications to be referred to, Fig. 5 being a section on the line 5—5, Fig. 4.

The holder herein shown as embodying this invention is provided with a member $a$ having at one end a bent finger or clip $b$ rigidly secured to the member $a$ and extended therefrom substantially at right angles to practically form a hook, which is adapted to engage the rear surface of the upper cross bar $d$ of the lower sash of a window.

The member $a$ in the present instance is shown as composed of two rods (see Fig. 3) which are joined at their outer ends by the clip or finger $b$, herein shown as a bent metal plate. The member $a$ has co-operating with it an inclined member $e$, which may be a wire rod bent to form a loop or yoke and which is pivotally secured to the member $a$, by a pivot pin $f$, having a threaded end which is engaged by a thumb-nut $i$. The inclined member $e$ is designed to engage the glass $h$ of the lower sash of the window and act as a brace to support the outer end of the member $a$, when the said members are secured together against turning on the pivot pin $f$ by the nut $i$. The pivot pin $f$ also has mounted on it a third member or arm $j$, to the outer end of which the mirror $k$ is secured in any suitable manner, and in the present instance the arm $j$ is pivotally secured at $m$ between the two parts or halves $n$ of a bail to which the mirror is pivoted as at $o$.

The bent clip or hook $b$ is made substantially thin and flat to permit it to be inserted between the cross bars $d$, $p$ of the lower and upper sashes of the window when the window is closed, as represented in Fig. 1. The clip or hook $b$ is held in engagement with a cross bar $d$ of the lower sash and prevented from being disengaged therefrom by the weight of the mirror, by the inclined member $e$, which is turned on the pivot $f$ until its lower end bears against the glass pane $h$ of the lower sash, after which the two members $a$, $e$ are firmly clamped together by turning upon the nut $i$, and when the members $a$, $e$ are thus clamped together, they form a practically stationary bracket for supporting the mirror, which latter may be raised and lowered so as to adjust it to the proper position for use by turning the member or arms $j$ on the pivot $f$ before the nut $i$ is turned up.

It will be observed that the finger or clip is rigid with the member $a$ and forms a hook for engaging the cross bar of the lower sash of the window and that said hook is retained in engagement with said cross bar irrespective of the position of the lower sash, consequently the mirror may be supported from said cross bar with the lower sash in the closed or open position of the window.

Figure 5:
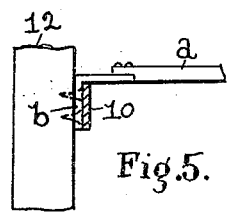
Figure 4:
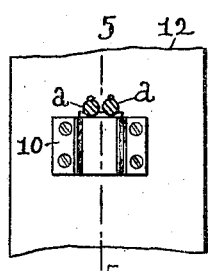

The improved holder may also be used with other supports than the window, as for instance it may be used with metal plates 10 secured to the wall 12 of a room and offset therefrom so as to permit the hook or clip $b$ to be inserted between said plate and the wall after the manner represented in Figs. 4 and 5. So also the mirror holder may be detachably secured to any other support which permits the hooked member to be engaged with the rear side thereof and the inclined member with the front side thereof.

The pivotal connection of the two members $a$, $e$ enables the holder to be adjusted to supports of varying thickness, and also permits the parts to be folded together after the manner represented in Fig. 3, thereby facilitating packing in a grip or bag.

Claims.

1. In combination, a member provided with a bent finger or hook rigid therewith and capable of engaging the rear surface of a support, a second member pivotally secured to the first-mentioned member and inclined downwardly toward said support to form a brace for the first-mentioned member, a third member pivotally secured to the first-mentioned member, a mirror pivoted to said third member, and means to firmly secure said members in a fixed position with relation to one another, substantially as described.

2. In combination, a substantially horizontal member provided with a bent finger or hook rigid therewith and capable of engaging the rear surface of the cross bar of the lower sash of a window, a second member pivotally secured to the first-mentioned member and downwardly inclined to engage the front surface of the glass of said lower sash, a third member pivotally secured to the first-mentioned member, a mirror secured to said third member and means to secure said members together in a fixed position with relation to each other, substantially as described.

3. In combination, a member provided with a bent finger or hook rigid therewith and capable of engaging the rear surface of a support, a second member pivotally secured to the free end of the first-mentioned member and inclined downwardly toward said support to engage therewith, and a third member pivotally connected with said second member, a device secured to said third member and means to secure said third member in fixed relation to said second member, substantially as described.

In testimony whereof, I have signed my name to this specification in the presence of two subscribing witnesses.

FREDERICK P. FISHER.

Witnesses:
  JAS. H. CHURCHILL,
  J. MURPHY.